United States Patent
Santoso et al.

(10) Patent No.: US 9,322,352 B2
(45) Date of Patent: Apr. 26, 2016

(54) SYSTEM AND METHOD FOR PREVENTING MISFIRE DURING ENGINE STARTUP

(75) Inventors: Halim G. Santoso, Novi, MI (US); Robert Douglas Shafto, New Hudson, MI (US); James R. Yurgil, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 806 days.

(21) Appl. No.: 13/470,874

(22) Filed: May 14, 2012

(65) Prior Publication Data

US 2013/0304362 A1    Nov. 14, 2013

(51) Int. Cl.
| | |
|---|---|
| *F02D 41/04* | (2006.01) |
| *F02P 5/15* | (2006.01) |
| *F02D 41/00* | (2006.01) |
| *F02N 11/08* | (2006.01) |

(52) U.S. Cl.
CPC .......... *F02D 41/042* (2013.01); *F02D 41/0002* (2013.01); *F02P 5/1506* (2013.01); *F02D 41/009* (2013.01); *F02D 2200/0406* (2013.01); *F02N 11/0822* (2013.01); *F02N 2200/023* (2013.01); *F02N 2200/024* (2013.01); *F02N 2200/0801* (2013.01); *F02N 2200/102* (2013.01); *F02N 2200/122* (2013.01); *F02N 2250/04* (2013.01); *Y02T 10/42* (2013.01); *Y02T 10/46* (2013.01)

(58) Field of Classification Search
CPC . F02D 41/042; F02D 41/0002; F02D 41/009; F02P 5/1506; Y02T 10/42; Y02T 10/46; Y02T 10/48
See application file for complete search history.

(56) References Cited

U.S. PATENT DOCUMENTS

| | | | |
|---|---|---|---|
| 4,492,195 A | 1/1985 | Takahashi et al. |
| 4,495,925 A | 1/1985 | Hasegawa |
| 4,958,516 A | 9/1990 | Stiles et al. |
| 5,690,073 A | 11/1997 | Fuwa |
| 5,803,040 A | 9/1998 | Biesinger et al. |
| 6,155,242 A | 12/2000 | Kotwicki et al. |
| 6,202,776 B1 | 3/2001 | Masberg et al. |
| 6,257,207 B1 | 7/2001 | Inui et al. |
| 6,275,759 B1 | 8/2001 | Nakajima et al. |
| 6,513,489 B2 | 2/2003 | Osanai |
| 6,675,088 B2 | 1/2004 | Miki |

(Continued)

FOREIGN PATENT DOCUMENTS

| | | |
|---|---|---|
| CN | 1407221 A | 4/2003 |
| CN | 1875186 A | 12/2006 |

(Continued)

OTHER PUBLICATIONS

U.S. Appl. No. 13/672,126, filed Nov. 8, 2012, Santoso et al.

(Continued)

*Primary Examiner* — Hieu T Vo
*Assistant Examiner* — Sherman Manley

(57) ABSTRACT

A system according to the principles of the present disclosure includes a stop-start module and a throttle control module. The stop-start module stops an engine when a driver depresses a brake pedal while an ignition system is on and the engine is idling. The throttle control module selectively opens a throttle valve when fuel injection in the engine is stopped while the ignition system is on based on engine speed and a manifold pressure within an intake manifold. The stop-start module starts the engine when the driver releases the brake pedal.

20 Claims, 3 Drawing Sheets

(56) References Cited

U.S. PATENT DOCUMENTS

| | | | |
|---|---|---|---|
| 6,675,768 B2 | 1/2004 | Kanai | |
| 6,758,190 B2 | 7/2004 | Denz et al. | |
| 6,857,987 B2 | 2/2005 | Aldrich, III et al. | |
| 6,910,457 B2* | 6/2005 | Grieser | F02D 9/02 |
| | | | 123/198 DB |
| 6,931,318 B2 | 8/2005 | Kaita et al. | |
| 6,987,373 B2 | 1/2006 | Kagami et al. | |
| 7,027,911 B2* | 4/2006 | Nishikawa | F02D 41/042 |
| | | | 123/198 C |
| 7,079,935 B2 | 7/2006 | Lewis et al. | |
| 7,079,941 B2* | 7/2006 | Tetsuno et al. | 701/112 |
| 7,082,930 B2 | 8/2006 | Liller et al. | |
| 7,130,731 B2 | 10/2006 | Itoh et al. | |
| 7,146,960 B2 | 12/2006 | Phlips et al. | |
| 7,159,571 B2 | 1/2007 | Kassner | |
| 7,177,755 B2 | 2/2007 | Nishikawa et al. | |
| 7,204,226 B2 | 4/2007 | Zillmer et al. | |
| 7,275,509 B2 | 10/2007 | Kassner | |
| 7,331,320 B2 | 2/2008 | Asada | |
| 7,559,304 B2 | 7/2009 | Kataoka et al. | |
| 7,587,270 B2 | 9/2009 | Tabata et al. | |
| 7,614,377 B2 | 11/2009 | Noguchi | |
| 7,664,594 B2* | 2/2010 | Kojima | F02D 11/10 |
| | | | 123/179.16 |
| 7,681,545 B2 | 3/2010 | Taki et al. | |
| 7,809,493 B2* | 10/2010 | Adachi | F02D 41/009 |
| | | | 701/112 |
| 7,827,975 B1* | 11/2010 | Gibson | F02N 11/0814 |
| | | | 123/179.3 |
| 7,848,875 B2* | 12/2010 | Nakai | F02D 41/062 |
| | | | 123/179.3 |
| 7,931,002 B1 | 4/2011 | Gibson et al. | |
| 8,099,203 B2 | 1/2012 | Miller et al. | |
| 8,140,247 B2 | 3/2012 | Gibson et al. | |
| 8,141,533 B2 | 3/2012 | Demura | |
| 8,157,035 B2 | 4/2012 | Whitney et al. | |
| 8,214,112 B2 | 7/2012 | Rew et al. | |
| 8,240,297 B2 | 8/2012 | Gibson et al. | |
| 8,290,693 B2* | 10/2012 | Shoda | F02D 41/0002 |
| | | | 123/179.18 |
| 8,408,176 B2 | 4/2013 | Pursifull et al. | |
| 8,442,747 B2 | 5/2013 | Ma et al. | |
| 8,543,318 B2 | 9/2013 | Ma et al. | |
| 8,635,987 B2 | 1/2014 | Ma et al. | |
| 8,812,221 B2* | 8/2014 | Hozumi | F02D 41/042 |
| | | | 123/481 |
| 8,855,896 B2* | 10/2014 | Ma | F02D 17/04 |
| | | | 123/179.4 |
| 8,892,339 B2 | 11/2014 | Ma et al. | |
| 8,972,150 B2 | 3/2015 | Ma et al. | |
| 2004/0000281 A1 | 1/2004 | Wakitani et al. | |
| 2004/0084002 A1 | 5/2004 | Mitsutani et al. | |
| 2004/0153236 A1 | 8/2004 | Itoh et al. | |
| 2005/0109302 A1 | 5/2005 | Tetsuno et al. | |
| 2005/0221952 A1* | 10/2005 | Tetsuno | F02N 11/0814 |
| | | | 477/115 |
| 2006/0048734 A1 | 3/2006 | Kataoka et al. | |
| 2006/0218923 A1 | 10/2006 | Sopko et al. | |
| 2007/0062476 A1* | 3/2007 | Ota | F02B 23/104 |
| | | | 123/179.4 |
| 2007/0084429 A1 | 4/2007 | Taki et al. | |
| 2007/0163531 A1 | 7/2007 | Lewis et al. | |
| 2007/0261668 A1* | 11/2007 | Kataoka | F02D 41/0002 |
| | | | 123/319 |
| 2008/0066706 A1 | 3/2008 | Nakamura et al. | |
| 2008/0091328 A1 | 4/2008 | Tabata et al. | |
| 2008/0275624 A1 | 11/2008 | Snyder | |
| 2009/0037085 A1 | 2/2009 | Kojima | |
| 2009/0066337 A1 | 3/2009 | Gibson et al. | |
| 2009/0299586 A1 | 12/2009 | Miller et al. | |
| 2010/0038158 A1 | 2/2010 | Whitney et al. | |
| 2010/0114461 A1* | 5/2010 | Gibson | F02D 41/0002 |
| | | | 701/112 |
| 2010/0114462 A1* | 5/2010 | Gibson | F02D 41/0002 |
| | | | 701/113 |
| 2010/0174473 A1 | 7/2010 | Pursifull et al. | |
| 2010/0211299 A1 | 8/2010 | Lewis et al. | |
| 2011/0146609 A1 | 6/2011 | Enoki | |
| 2011/0295489 A1 | 12/2011 | Ma et al. | |
| 2012/0132163 A1 | 5/2012 | Shoji et al. | |
| 2012/0192826 A1 | 8/2012 | Shafto | |
| 2012/0245831 A1 | 9/2012 | Patterson et al. | |
| 2013/0000599 A1 | 1/2013 | Okamoto et al. | |
| 2013/0066540 A1 | 3/2013 | Lewis et al. | |
| 2013/0080039 A1* | 3/2013 | Nakamoto | F02D 41/009 |
| | | | 701/113 |
| 2013/0096811 A1 | 4/2013 | Yamauchi et al. | |
| 2013/0138328 A1 | 5/2013 | Shimo et al. | |
| 2013/0304362 A1 | 11/2013 | Santoso et al. | |
| 2014/0129117 A1 | 5/2014 | Santoso et al. | |

FOREIGN PATENT DOCUMENTS

| | | |
|---|---|---|
| CN | 1912370 A | 2/2007 |
| CN | 101598214 A | 12/2009 |
| CN | 101680414 A | 3/2010 |
| CN | 101900045 A | 12/2010 |
| CN | 102269073 | 12/2011 |
| DE | 102005049092 A1 | 4/2007 |
| JP | 02081939 A | 3/1990 |
| JP | 2009-062960 A | 3/2009 |

OTHER PUBLICATIONS

U.S. Appl. No. 14/559,003, filed Dec. 3, 2014, Shafto et al.

Ohata et al., "Benchmark Problem for Automotive Engine Control", SICE Annual Conference, Sep. 2007, pp. 1723-1726.

Rokusho et al., "Combined Feedforward and Feedback Control for Start-Up Engine Control", 27th Chinese Control Conference, Jul. 2008, pp. 562-565.

Zhang et al., "Model-Based Cold-Start Speed Control Design for SI Engines", Proceedings of the 17th World Congress of the International Federation of Automatic Control, Jul. 2008, pp. 1042-1047.

Saerens et al., "Minimization of the Fuel Consumption of a Gasoline Engine Using Dynamic Optimization", Applied Energy, vol. 86 Iss. 9, Sep. 2009, pp. 1582-1588.

Rajamani, "Vehicle Dynamics and Control", 2006, pp. 111-117.

\* cited by examiner

SYSTEM AND METHOD FOR PREVENTING MISFIRE DURING ENGINE STARTUP

FIELD

The present disclosure relates to internal combustion engines, and more specifically, to systems and methods for preventing misfire during engine startup.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines. When an engine misfires, an air/fuel mixture provided to a cylinder may not combust at all or may combust only partially.

Misfire prevention systems have been developed to prevent engine misfire. Traditional misfire prevention systems, however, do not prevent engine misfire as effectively as desired.

SUMMARY

A system according to the principles of the present disclosure includes a stop-start module and a throttle control module. The stop-start module stops an engine when a driver depresses a brake pedal while an ignition system is on and the engine is idling. The throttle control module selectively opens a throttle valve when fuel injection in the engine is stopped while the ignition system is on based on engine speed and a manifold pressure within an intake manifold. The stop-start module starts the engine when the driver releases the brake pedal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine control system may automatically shut down an engine when the engine is idling to reduce fuel consumption and emissions. The engine control system may automatically shut down the engine when a driver depresses a brake pedal and vehicle speed is zero. The engine control system may automatically restart the engine when the driver releases the brake pedal after the engine is automatically shut down.

During engine shutdown, a rotation direction of a crankshaft in the engine may be reversed before the crankshaft stops. In turn, a piston coupled to the crankshaft may stop near top dead center (TDC) before movement of the piston is reversed. This reversal of piston movement during engine shutdown may be referred to as rock back. As the piston rocks back, the piston may draw exhaust gas into the cylinder in which the piston is disposed. Exhaust gas may also be drawn into an intake manifold of the engine due to a pressure difference between the intake manifold and the cylinders. When the engine is restarted, exhaust gas may flow from the intake manifold to the cylinder, and exhaust gas present within the cylinder may cause the cylinder to misfire.

An engine control system and method according to the principles of the present disclosure prevents engine misfire when an engine is restarted by opening a throttle when the engine is shutting down. The throttle may be opened when the engine speed is less than a predetermined speed and the pressure within an intake manifold is less than a predetermined pressure. The throttle may be closed when the manifold pressure is greater than or equal to the predetermined pressure. Opening a throttle when an engine is shutting down increases the pressure within an intake manifold of the engine. In turn, exhaust gas is not drawn into the intake manifold, and less exhaust gas is present in the cylinder to cause the cylinder to misfire when the engine is restarted.

An engine control system and method according to the principles of the present disclosure prevents engine misfire by advancing spark timing when the engine is restarted. The spark timing may be advanced by an amount that is proportional to the position of the piston in the cylinder relative to TDC before movement of the piston is reversed while the engine is shutting down. Advancing the spark timing in proportion to the piston position before movement of the piston is reversed ensures that exhaust gas present in the cylinder is combusted, and thereby prevents the cylinder from misfiring.

Figure 1:
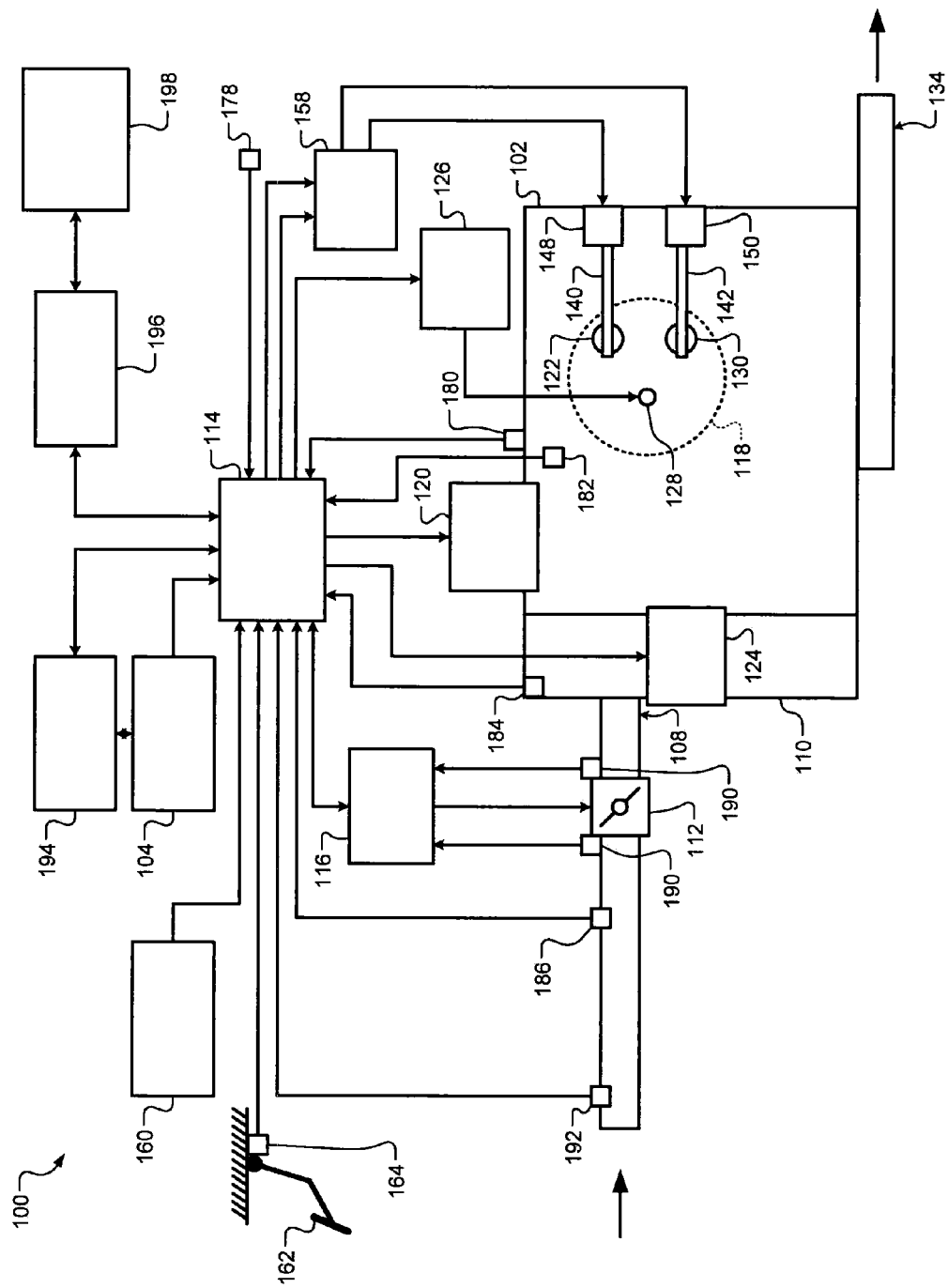
FIG. 1 is a functional block diagram of an example engine system according to the principles of the present disclosure.

Referring to FIG. 1, an engine system 100 includes an engine 102 that combusts an air/fuel mixture to produce drive torque for a vehicle based on driver input from a driver input module 104. The driver input may be based on a position of an accelerator pedal. The driver input may also be based on cruise control, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The ECM 114 may start the engine 102 and stop the engine 102 based on input received from an ignition system 160. The ignition system 160 may include a key or a button. The ECM 114 may start the engine 102 when a driver turns the key from an off position to an on position or when the driver presses the button. The ECM 114 may stop the engine 102 when a driver turns the key from the on position to the off position or when the driver presses the button while the engine 102 is running.

A driver may depress a brake pedal 162 to decelerate and/or stop the vehicle. The engine system 100 may measure the position of the brake pedal 162 using a brake pedal position (BPP) sensor 164. The ECM 114 may determine when the brake pedal 162 is depressed or released based on input received from the BPP sensor 164 and/or based on input received from a brake line pressure sensor (not shown).

The engine system 100 may measure the speed of the vehicle using a vehicle speed sensor (VSS) 178. The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

The ECM 114 may determine engine speed based on input received from the CKP sensor 180. The CKP sensor 180 may include a Hall effect sensor, optical sensor, an inductor sensor, and/or another suitable type of sensor that is positioned adjacent to a disk having N teeth (e.g., 58 teeth). The disk may rotate with the crankshaft while the sensor remains stationary. The sensor may detect when the teeth pass by the sensor. The ECM 114 may determine the engine speed based on an amount of crankshaft rotation between tooth detections and a period between the tooth detections.

The CKP sensor 180 may include a bidirectional crankshaft sensor that detects the direction in which the teeth are traveling as the teeth pass by the sensor. Thus, the CKP sensor 180 can detect crankshaft position and the direction of crankshaft rotation. The ECM 114 may determine when the direction of crankshaft rotation is reversed based on input received from the CKP sensor 180.

The ECM 114 may automatically shut down the engine 102 when the engine 102 is idling to reduce fuel consumption and emissions. The ECM 114 may shut down the engine 102 when the vehicle speed is less than or equal to a predetermined speed (e.g., zero) and the driver depresses the brake pedal 162. The ECM 114 may automatically restart the engine 102 when the driver releases the brake pedal 162.

The ECM 114 may prevent the engine 102 from misfiring during startup by opening the throttle valve 112 for a brief period (e.g., between 15 and 200 milliseconds) while the engine 102 is shutting down. The ECM 114 may open the throttle valve 112 when the engine speed is less than a predetermined speed and the manifold pressure (i.e., the pressure within the intake manifold 110) is less than a predetermined pressure. The ECM 114 may close the throttle valve 112 when the manifold pressure is greater than or equal to the predetermined pressure.

The ECM 114 may prevent the engine 102 from misfiring during startup by advancing spark timing when the engine 102 is started. The spark timing may be advanced by an amount that is proportional to the position of the piston within the cylinder 118 relative to TDC before rock back (i.e., before movement of the piston is reversed while the engine 102 is shutting down). The ECM 114 may determine the piston position based on input received from the CKP sensor 180.

If the engine 102 includes multiple cylinders, the ECM 114 may independently advance spark timing for one or more of the cylinders when the engine 102 is started. The ECM 114 may advance the spark timing for the cylinders by an amount that is proportional to the position of the pistons within the cylinders relative to TDC before rock back. The ECM 114 may determine the piston positions based on input received from the CKP sensor 180.

Figure 2:
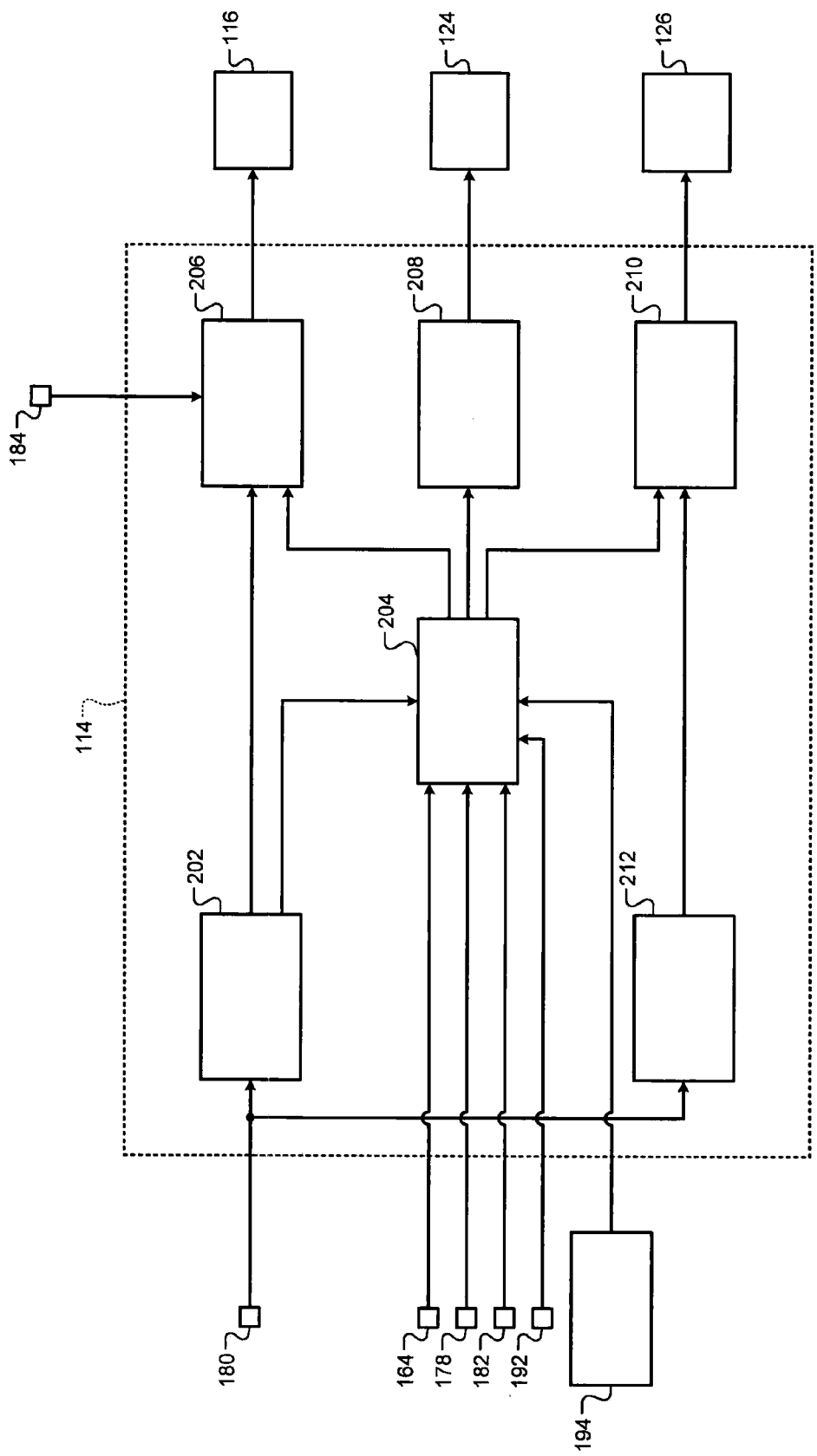
FIG. 2 is a functional block diagram of an example engine control system according to the principles of the present disclosure.

Referring to FIG. 2, the ECM 114 may include a speed determination module 202, a stop-start module 204, a throttle control module 206, a fuel control module 208, a spark control module 210, and a position determination module 212. The speed determination module 202 determines engine speed. The speed determination module 202 may determine engine speed based on input received from the CKP sensor 180. The speed determination module 202 may determine engine speed based on an amount of crankshaft rotation between tooth detections and the corresponding period. The speed determination module 202 outputs the engine speed.

The stop-start module 204 automatically stops and restarts the engine 102 when the engine 102 is idling. The stop-start module 204 may automatically stop the engine 102 when the vehicle speed is less than or equal to a predetermined speed (e.g., zero) and the driver depresses the brake pedal 162. The stop-start module 204 may automatically restart the engine 102 when the driver releases the brake pedal 162. The stop-start module 204 may receive the vehicle speed from the VSS sensor 178. The stop-start module 204 may determine when the driver depresses or releases the accelerator pedal based on input received from the BPP sensor 164.

The stop-start module 204 may ensure that additional conditions are satisfied before automatically stopping the engine 102. For example, the stop-start module 204 may ensure that the engine coolant temperature is greater than a first temperature, a transmission oil temperature is greater than a second temperature, and ambient air temperature is within a temperature range. The first temperature, the second temperature, and the temperature range may be predetermined.

The stop-start module 204 may receive the engine coolant temperature from the ECT sensor 182. The stop-start module 204 may estimate the ambient air temperature based on the intake air temperature. The start-stop module 204 may receive the intake air temperature from the IAT sensor 192. The stop-start module 204 may receive the transmission oil temperature from the transmission control module 194 and/or a transmission oil temperature sensor (not shown).

The stop-start module 204 may automatically stop and restart the engine 102 by sending signals to the throttle control module 206, the fuel control module 208, and/or the spark control module 210. The throttle control module 206 may stop or start the engine 102 by instructing the throttle actuator module 116 to close or open the throttle valve 112. The fuel control module 208 may stop or start the engine 102 by instructing the fuel actuator module 124 to stop or start providing fuel to the cylinder 118. The spark control module 210 may stop or start the engine 102 by instructing the spark actuator module 126 to stop or start providing spark to the cylinder 118.

The position determination module 212 determines the position of the piston within the cylinder 118. The position determination module 212 may determine the position of the piston relative to TDC based on input received from the CKP sensor 180. If the engine 102 includes multiple cylinders, the position determination module 212 may determine the positions of the pistons within the cylinders relative to TDC based on input received from the CKP sensor 180. The position determination module 212 may determine the piston position(s) based on a predetermined relationship between the crankshaft position and the piston position(s). The position determination module 212 outputs the piston position(s).

The throttle control module 206 may prevent the engine 102 from misfiring during startup by instructing the throttle actuator module 116 to open the throttle valve 112 while the engine 102 is shutting down. The throttle control module 206 may send instructions to open the throttle valve 112 at a first time when the engine speed is less than a first speed and the manifold pressure is less than a first pressure. Opening the throttle valve 112 before the first time may cause the engine 102 to vibrate. Opening the throttle valve 112 after the first time may not prevent the engine 102 from misfiring. The throttle control module 206 may receive the manifold pressure from the MAP sensor 184. The throttle control module 206 may send instructions to close the throttle valve 112 when the manifold pressure is greater than or equal to the first pressure.

The spark control module 210 may prevent the engine 102 from misfiring during startup by instructing the spark actuator module 126 to advance spark timing when the engine 102 is started. The spark control module 210 may send instructions to advance spark timing by an amount that is proportional to the piston position(s) relative to TDC before rock back (i.e., before movement of the piston(s) is reversed while the engine 102 is shutting down). The spark control module 210 may receive the piston position(s) from the position determination module 212.

The spark control module 210 may independently advance spark timing for one or more cylinders in the engine 102 when the engine 102 is started. When the engine 102 is restarted after an automatic stop, a misfire may occur during the second firing event (i.e., the second event in a firing order of the engine 102) as the engine 102 is restarted. Thus, the spark control module 210 may advance the spark timing of the cylinder in which the second firing event occurs as the engine 102 is restarted.

Figure 3:
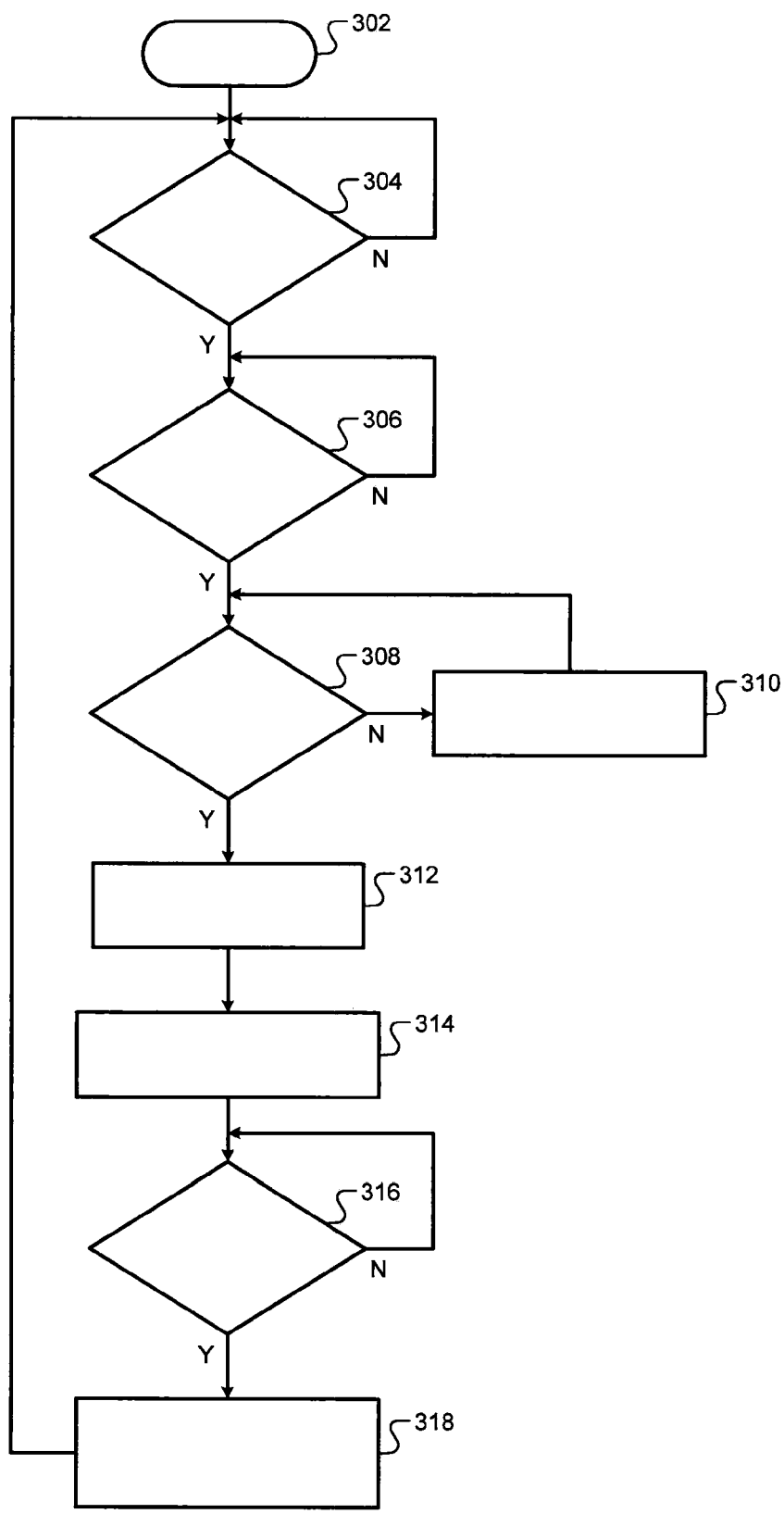
FIG. 3 is a flowchart illustrating an example engine control method according to the principles of the present disclosure.

Referring to FIG. 3, a method for preventing engine misfire during engine startup begins at 302. At 304, the method determines whether an automatic stop is enabled. An automatic stop may be enabled when a vehicle speed is less than or equal to a predetermined speed (e.g., zero) and a driver depresses a brake pedal. If an automatic stop is enabled, the method continues at 306.

At 306, the method determines whether an engine speed is greater than a first speed. The first speed may be a predetermined speed (e.g., 400 revolutions per minute). If the engine speed is greater than the first speed, the method continues at 308. At 308, the method determines whether a manifold pressure (i.e., a pressure within an intake manifold) is greater than or equal to a first pressure. The first pressure may be a predetermined pressure (e.g., 10 kilopascals less than ambient pressure).

If the manifold pressure is less than the first pressure, the method continues at 310. At 310, the method opens a throttle valve. If the manifold pressure is greater than or equal to the first pressure, the method continues at 312. At 312, the method closes the throttle valve. At 314, the method determines the position of one or more pistons in an engine before rock back (i.e., before movement of the piston(s) is reversed while the engine is stopping).

At 316, the method determines whether an automatic start is enabled. An automatic start may be enabled when a driver releases the brake pedal after an automatic stop. If an automatic start is enabled, the method continues at 318. At 318, the method advances spark timing for one or more cylinders in the engine based on the piston position(s) before rock back. The method may advance spark timing by an amount that is proportional to a difference between the piston position and TDC.

A system and method for preventing engine misfire according to the principles of the present disclosure may apply to vehicles equipped with a stop-start system and vehicles that are not equipped with a stop-start system. A system and method may prevent engine misfire during engine startup by minimizing the amount of valve overlap during engine shutdown to prevent exhaust gas from flowing into an intake manifold. Valve overlap may be minimized by adjusting a camshaft resting position. However, minimizing valve overlap during engine shutdown may increase cold start emissions.

A system and method may prevent engine misfire during engine startup by purging the contents of cylinders in an engine before providing spark to the cylinders. However, this may increase the amount of time required to start the engine. The size of a starter motor that starts the engine may be increased to reduce the amount of time required to start the engine. However, this may increase the cost of the starter motor.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
a stop-start module that stops an engine when a driver depresses a brake pedal while an ignition system is on and the engine is idling, and that starts the engine when the driver releases the brake pedal; and
a throttle control module that, based on engine speed when fuel injection in the engine is stopped and a manifold pressure within an intake manifold, selectively opens a throttle valve when fuel injection in the engine is stopped while the ignition system is on.

2. The system of claim 1 wherein the throttle control module selectively opens the throttle valve when the engine speed is less than a predetermined speed.

3. The system of claim 2 wherein the throttle control module opens the throttle valve when the manifold pressure is less than a predetermined pressure.

4. The system of claim 3 wherein the throttle control module closes the throttle valve when the manifold pressure is greater than or equal to the predetermined pressure.

5. The system of claim 4 wherein the predetermined pressure is approximately equal to atmospheric pressure.

6. The system of claim 1 further comprising a position determination module that determines a piston position when the engine is stopping and a direction of crankshaft rotation is reversed.

7. The system of claim 6 wherein the position determination module determines the piston position based on input received from a bidirectional crankshaft sensor.

8. The system of claim 6 further comprising a spark control module that advances spark timing when the engine is starting based on the piston position when the engine is stopping.

9. The system of claim 8 wherein the spark control module advances the spark timing by an amount that is based on a difference between the piston position and top dead center.

10. The system of claim 1 further comprising a speed determination module that determines the engine speed based on input received from a crankshaft position sensor.

11. A method comprising:
stopping an engine when a driver depresses a brake pedal while an ignition system is on and the engine is idling;
selectively opening a throttle valve when fuel injection in the engine is stopped while the ignition system is on based on engine speed when fuel injection in the engine is stopped and a manifold pressure within an intake manifold; and
starting the engine when the driver releases the brake pedal.

12. The method of claim 11 further comprising selectively opening the throttle valve when the engine speed is less than a predetermined speed.

13. The method of claim 12 further comprising opening the throttle valve when the manifold pressure is less than a predetermined pressure.

14. The method of claim 13 further comprising closing the throttle valve when the manifold pressure is greater than or equal to the predetermined pressure.

15. The method of claim 14 wherein the predetermined pressure is approximately equal to atmospheric pressure.

16. The method of claim 11 further comprising determining a piston position when the engine is stopping and a direction of crankshaft rotation is reversed.

17. The method of claim 16 further comprising determining the piston position based on input received from a bidirectional crankshaft sensor.

18. The method of claim 16 further comprising advancing spark timing when the engine is starting based on the piston position when the engine is stopping.

19. The method of claim 18 further comprising advancing the spark timing by an amount that is based on a difference between the piston position and top dead center.

20. The method of claim 11 further comprising determining the engine speed based on input received from a crankshaft position sensor.

* * * * *